US011705999B2

(12) United States Patent
Venugopal et al.

(10) Patent No.: US 11,705,999 B2
(45) Date of Patent: Jul. 18, 2023

(54) TRANSMISSION CONFIGURATION INDICATOR POOL ACROSS MULTIPLE COMPONENT CARRIERS

(71) Applicant: QUALCOMM INCORPORATED, San Diego, CA (US)

(72) Inventors: Kiran Venugopal, Raritan, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/454,698

(22) Filed: Nov. 12, 2021

(65) Prior Publication Data

US 2022/0224459 A1 Jul. 14, 2022

Related U.S. Application Data

(60) Provisional application No. 63/136,927, filed on Jan. 13, 2021.

(51) Int. Cl.
*H04J 13/16* (2011.01)
*H04L 5/00* (2006.01)
*H04B 7/08* (2006.01)
*H04W 72/044* (2023.01)
*H04W 72/21* (2023.01)

(52) U.S. Cl.
CPC ............. *H04L 5/001* (2013.01); *H04B 7/086* (2013.01); *H04L 5/0046* (2013.01); *H04W 72/046* (2013.01); *H04W 72/21* (2023.01)

(58) Field of Classification Search
CPC .... H04B 7/0695; H04B 7/088; H04B 7/0617; H04B 7/024; H04B 7/0408; H04B 7/0626; H04B 7/0404; H04B 7/06; H04W 72/042; H04W 72/0466; H04W 16/28; H04W 72/0446; H04W 72/046; H04W 72/0413; H04W 72/048; H04W 72/1289; H04L 5/0053; H04L 5/001; H04L 5/0048; H04L 5/0023; H04L 5/0094; H04L 5/0051; H04L 5/0091; H04L 5/0098
USPC ........................................................ 375/262
See application file for complete search history.

(56) References Cited

U.S. PATENT DOCUMENTS

2014/0126434 A1\* 5/2014 Li ............................. H04L 5/14
370/280
2021/0351834 A1\* 11/2021 Yang ..................... H04W 16/28

FOREIGN PATENT DOCUMENTS

WO WO-2022132631 A1 \* 6/2022

\* cited by examiner

*Primary Examiner* — Eva Y Puente
(74) *Attorney, Agent, or Firm* — Holland & Hart LLP

(57) ABSTRACT

Methods, systems, and devices for wireless communications are described. A user equipment (UE) may communicate with a base station using a beamforming configuration, according to a transmission configuration indicator (TCI) configuration. The UE may receive a message including a TCI configuration. The UE may determine based on the TCI configuration, a TCI pool for a TCI state type of a set of TCI state types and a set of CCs. The UE may then perform the wireless communication via a directional beam based on the TCI pool for the TCI state type and the set of component carriers (CCs).

30 Claims, 15 Drawing Sheets

TRANSMISSION CONFIGURATION INDICATOR POOL ACROSS MULTIPLE COMPONENT CARRIERS

CROSS REFERENCE

The present Application for Patent claims the benefit of U.S. Provisional Patent Application No. 63/136,927 by VENUGOPAL et al., entitled "TRANSMISSION CONFIGURATION INDICATOR POOL ACROSS MULTIPLE COMPONENT CARRIERS," filed Jan. 13, 2021, assigned to the assignee hereof, and expressly incorporated by reference herein.

FIELD OF TECHNOLOGY

The following relates to wireless communications, including transmission configuration indicator (TCI) pool across multiple component carriers (CCs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). A UE may support directional, beamforming communication, with other communication devices, such as a base station. The UE may communicate according to a set of TCI states. In some examples, a base station may transmit, to a UE, signaling including an indication of a TCI state, and the UE may determine a beam configuration and spatial filter to use based on the TCI state.

SUMMARY

Various aspects of the described techniques relate to configuring a communication device, which may be a UE, to receive a single TCI pool configured for multiple CCs. As such, for a given TCI state type, the UE may use the configured TCI pool across a set of CCs. The TCI state type may include a joint downlink and uplink TCI, a downlink common beam TCI, or an uplink common beam TCI. Additionally, or alternatively, the TCI state type may include a downlink single channel TCI or an uplink single channel TCI. Any of the above combination of TCI types may share the same TCI pool but with different subsets of TCI indices per type. Alternatively, each of the above TCI types may have its own TCI pool. In some examples, the UE may receive a TCI state identifier of the common TCI pool, and the UE may check a beam indication and time or frequency tracking reference signal identifier in the corresponding TCI state to perform time or frequency tracking and spatial filter determination. In some examples, the CCs may be a configured CC list. The UE may thereby perform wireless communication via a directional beam based on the TCI pool for the TCI state type and the set of CCs. The described techniques may also provide improvements to power consumption and, in some examples, may promote enhanced efficiency for high reliability and low latency wireless communications, among other benefits.

DETAILED DESCRIPTION

Figure 1:
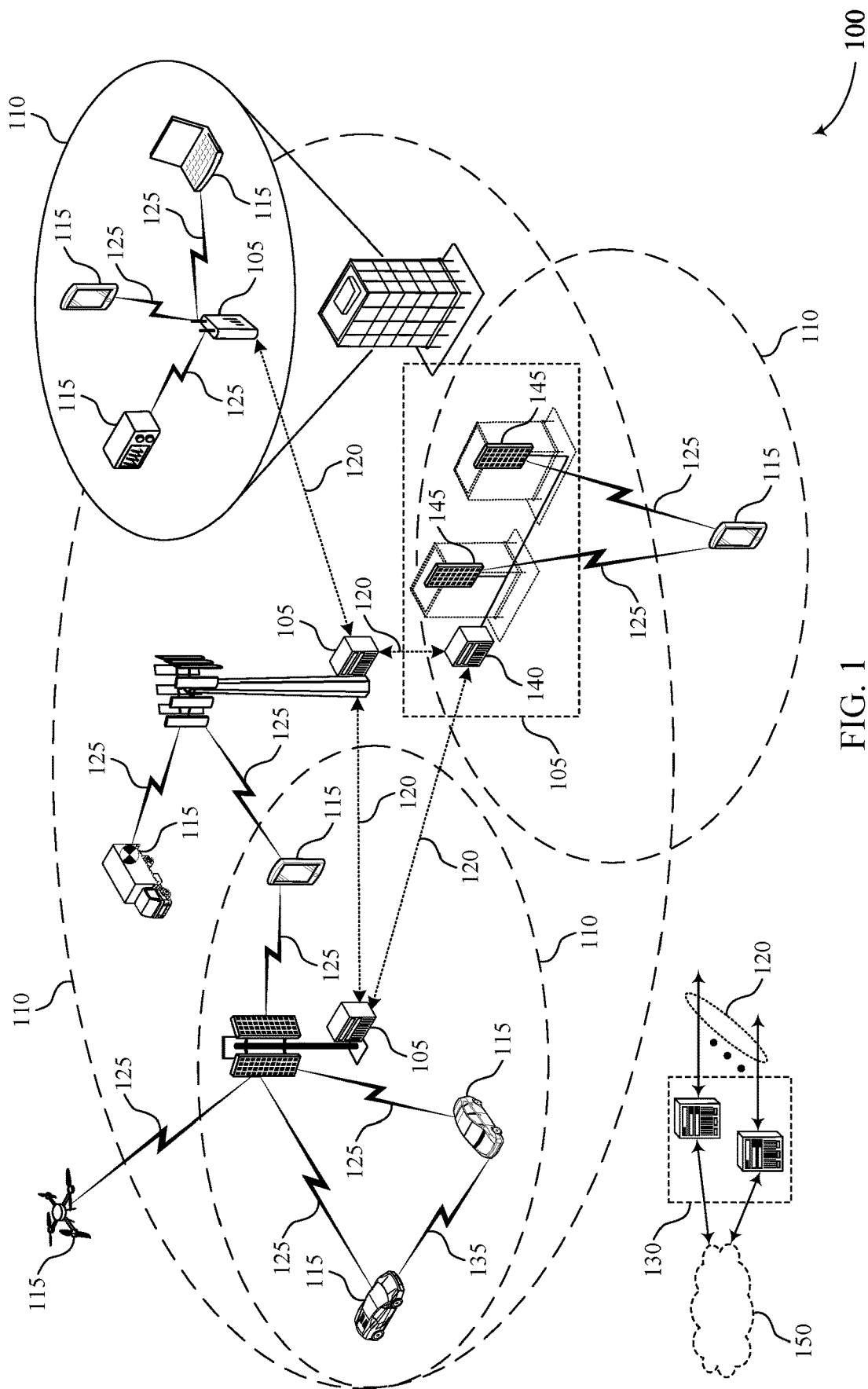
FIGS. 1 and 2 illustrate examples of wireless communications systems that support a TCI pool across multiple CCs in accordance with aspects of the present disclosure.

A wireless communications system may include various communication devices such as a UE and a base station, which may provide wireless communication services to the UE. For example, such a base station may be a next-generation NodeB (referred to as a gNB) that may support multiple radio access technologies including 4G systems, such as 4G LTE, as well as 5G systems, which may be referred to as 5G NR. In the wireless communications system, the UE may support directional communication (e.g., beamformed communication) with another communication device, for example, a base station. For example, a UE may communicate with a base station, or another network device, by transmitting uplink beamformed communications to the base station and receiving downlink beamformed communications from the base station. Beamforming, which may also be referred to as spatial filtering, directional transmission, or directional reception, is a signal processing technique that may be used at a UE to shape or steer an antenna beam along a spatial path between the UE and a receiving device, such as a base station or another UE.

In some cases, a base station may transmit, to the UE, a beam indication that informs the UE that a particular downlink beamformed transmission (e.g., a physical downlink control channel (PDCCH), a physical downlink shared channel (PDSCH)) uses the same downlink beam as a configured reference signal (e.g., a channel state information reference signal (CSI-RS), and the like). Additionally, the beam indication may inform the UE that the particular downlink beamformed transmission uses the same spatial filter as the configured reference signal. The beam indication may be based on a configuration and downlink signaling. The configuration and downlink signaling may be referred to as TCI states. Each TCI state may include information about a reference signal (e.g., a CSI-RS). By associating a downlink beamformed transmission (e.g., a PDCCH, a PDSCH) with a TCI state, the base station may inform the UE that the downlink beamformed transmission may be transmitted by the base station using the same spatial filter (e.g., beam configuration) as the reference signal associated with that TCI state. In some cases, additional signaling (e.g., including the beam indication followed by downlink signaling) from the base station may correspond to substantial overhead signaling. The overhead signaling may utilize UE signaling resources. Therefore, efficient signaling for conveying TCI state information may reduce signaling overhead.

To address the above shortcomings, various aspects of the present disclosure relate to configuring the UE to receive a single TCI state pool configured for multiple CCs. The multiple CCs may be a configured CC list. For example, for a given TCI state type, the UE may use the configured TCI state pool for each CC of a set of CCs. The different TCI state type may be one of joint downlink and uplink TCI, a downlink common beam TCI, an uplink common beam TCI, a downlink single channel TCI or an uplink single channel TCI. In some cases, any of the combinations of TCI types may share the same TCI pool but may correspond to different subsets of TCI indices for each TCI type. In other cases, each of the TCI types may have a separate TCI pool. The UE may receive a TCI state identifier of the common TCI pool. In these cases, the UE may check the beam indication and time or frequency tracking reference signal identifiers in the corresponding TCI state. The UE may then perform time or frequency tracking, or both, and receive filter determination or transmit filter determination, or both. This signaling may be streamlined such that the UE receives TCI configuration from a base station, which may indicate the common TCI state pool for the UE to use for each TCI state. This signaling may decrease overhead and improve communications efficiency at the UE.

Aspects of the present disclosure may be implemented to realize one or more of the following potential advantages or improvements, among others. The present disclosure may provide benefits and enhancements to the operation of the UE. For example, operations performed by the UE may provide improvements to beamformed communications. By configuring the UE with a TCI state pool configured for multiple CCs, the UE may experience reduced signaling overhead. In some examples, configuring the UE to support a common TCI state pool for the UE to use for each TCI state may support improvements in power savings for the UE. For example, the UE may increase its battery life by providing efficient beamformed communications.

Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to TCI pool across multiple CCs.

FIG. 1 illustrates an example of a wireless communications system 100 that supports a TCI pool across multiple CCs in accordance with aspects of the present disclosure. The wireless communications system 100 may include one or more base stations 105, one or more UEs 115, and a core network 130. In some examples, the wireless communications system 100 may be an LTE) network, an LTE-A network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink CCs and one or more uplink CCs according to a carrier aggregation configuration. Carrier aggregation may be used with both frequency division duplexing (FDD) and time division duplexing (TDD) CCs.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent a maximum supported subcarrier spacing, and $N_f$ may represent a maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple CCs. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

A UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with CCs operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. A UE 115 may communicate with a base station 105 using a beamforming configuration, according to a TCI configuration. The UE 115 may receive a message including a TCI configuration from a base station 105. The UE 115 may determine based on the TCI configuration, a TCI pool for a TCI state type of a set of TCI state types and a set of CCs. The UE 115 may then perform beamformed wireless communication via a directional beam based on the TCI pool for the TCI state type and the set of CCs.

Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
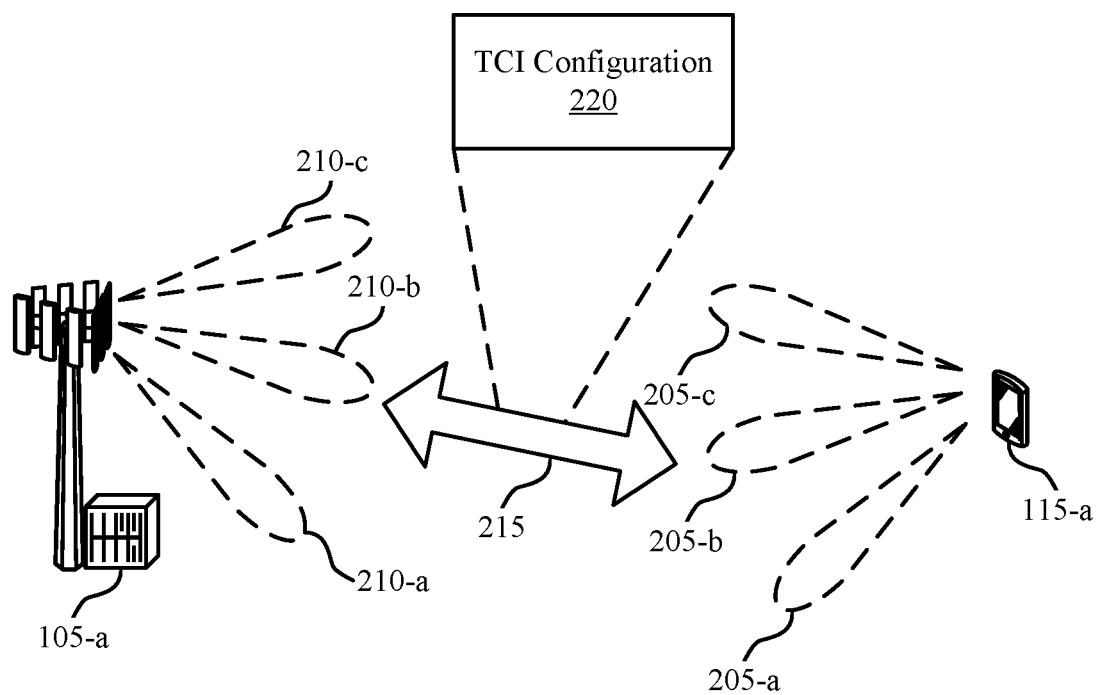

FIG. 2 illustrates an example of a wireless communications system 200 that supports a TCI pool across multiple CCs in accordance with aspects of the present disclosure. In some examples, the wireless communications system 200 may implement aspects of the wireless communications system 100 or may be implemented by aspects of the wireless communications system 100. For example, the wireless communications system 200 may include a base station 105-a and a UE 115-a that support beamformed wireless communication. The UE 115-a may be an example of a UE 115 as described with respect to FIG. 1. The base station 105-a may be an example of a base station 105 as described with respect to FIG. 1. The wireless communications system 200 may support multiple radio access technologies including 4G systems such as LTE systems, LTE-A systems, or LTE-A Pro systems, and 5G systems which may be referred to as NR systems. The wireless communications system 200 may support improvements to power consumption, spectral efficiency, higher data rates and, in some examples, may promote enhanced efficiency for higher reliability and lower latency beamformed operations, among other benefits.

The base station 105-a and the UE 115-a may be configured with multiple antennas, which may be used to employ techniques such as transmit diversity, receive diversity, multiple-input multiple-output communications, or beamforming, or any combination thereof. The antennas of the base station 105-a and the UE 115-a may be located within one or more antenna arrays or antenna panels, which may support multiple-input multiple-output operations or transmit or receive beamforming. For example, the base station 105-a antennas or antenna arrays may be co-located at an antenna assembly, such as an antenna tower. In some examples, antennas or antenna arrays associated with the base station 105-a may be located in diverse geographic locations. The base station 105-a may have an antenna array with a number of rows and columns of antenna ports that the base station 105-a may use to support beamforming of communications with the UE 115-a. Likewise, the UE 115-a may have one or more antenna arrays that may support various multiple-input multiple-output or beamforming operations. The base station 105-a and the UE 115-a may thus be configured to support directional communications using the multiple antennas.

The UE 115-a may communicate using transmit and receive beams 205. For example, the UE 115-a may communicate using one or more of a beam 205-a, a beam 205-b, and a beam 205-c. The base station 105-a may communicate using transmit and receive beams 210, and may communicate using one or more of a beam 210-a, a beam 210-b, and a beam 210-c. The base station 105-a and UE 115-a may support beamformed communication over a communication channel 215, which may be a PUCCH, a PUSCH, a PDCCH, or a PDSCH, or a combination thereof. In the wireless communications system 200, the UE 115-a may support operations to preserve resources (for example, time and frequency resources of the wireless communications system 200) or a battery life of the UE 115-a, among other examples. In some examples, the UE 115-a may be configured with a TCI pool across multiple CCs as described herein.

The UE 115-a may receive, from the base station 105-a, a beam indication that may inform the UE 115-a that a particular downlink transmission from the base station 105-a may use the same spatial filter as a configured reference signal. The configured reference signal may be a CSI-RS. The beam indication may be based on the combination of the configuration of the reference signal and downlink signaling. The configuration and downlink signaling may be referred to as TCI states. Each TCI state may include information about a reference signal (e.g., a CSI-RS). By associating a downlink transmission (e.g., a PDCCH, a PDSCH) with a TCI state, the base station 105-a may inform the UE 115-a that the downlink transmission may be transmitted by the base station 105-a using the same spatial filter (e.g., beam configuration) as the reference signal associated with that TCI state. In some cases, the additional signaling (e.g., including the beam indication followed by downlink signaling) from the base station 105-a may correspond to substantial overhead signaling. The overhead signaling may utilize signaling resources of UE 115-a. Therefore, efficient signaling for conveying TCI state information may reduce signaling overhead.

The UE 115-a may receive, from the base station 105-a, a TCI configuration 220 via the communication channel 215 (e.g., a PDCCH, a PDSCH). For example, the base station 105-a may transmit the TCI configuration 220 in RRC signaling, downlink control information (DCI) signaling, or MAC-CE signaling, or a combination thereof. The TCI configuration 220 may include an indication of a TCI state pool, which the UE 115-a may use for a particular TCI across different CCs. The specific different CCs may be a configured CC list. The UE 115-a may thus identify a single TCI state pool configured for multiple CCs for a particular TCI state. For example, for a given TCI state, the UE 115-a may identify a configured TCI state pool based on the received TCI configuration 220. The TCI state type may include at least a joint uplink and downlink TCI, a downlink common beam TCI, an uplink common beam TCI, a downlink single channel TCI, or an uplink single channel TCI. Additionally, or alternatively, a combination of one or more of the TCI state types described herein may share the same TCI pool, but may have different subsets of TCI indices within the pool per TCI type. Additionally, or alternatively, each TCI type may correspond to a separate TCI pool. Each of these combinations, the indices, or the separate TCI pool, may be indicated in the received TCI configuration 220.

The TCI configuration 220 may include an indication of a TCI state identifier of the common TCI pool. The UE 115-*a* may check the beam indication of the corresponding TCI state, check the time or frequency tracking, or both, of the reference signal identifiers in the TCI state corresponding to the TCI pool, in order to determine transmit and receive spatial filter configurations for one or more of the beams 205. In some examples, the UE 115-*a* may determine to use the same reference signal identifiers in a per CC configuration of configured CCs to perform time tracking, frequency tracking, or both and for receive spatial filter determination (e.g., receive beam 205 determination) or transmit spatial filter determination (e.g., transmit beam 205 determination), or both. This may be an example of a type-A reference signal configuration. In some other examples, the UE 115-*a* may determine to use the same reference signal identifiers on a reference CC to perform time tracking, frequency tracking, or both and for receive spatial filter or transmit spatial filter determination, or both. This may be an example of a type-D reference signal configuration. Either case of using the reference signals on a configured CC to determine spatial filtering, or on a reference CC to determine spatial filtering may be applied separately or jointly for different reference signals.

The configured CCs may be based on a configured CC list, which the UE 115-*a* may receive from the base station 105-*a*. For example, the TCI state may indicate the corresponding CC list, or the CC list may be implicitly determined by the UE 115-*a* based on the signaling in which the UE 115-*a* receives the TCI configuration 220. For example, the UE 115-*a* may receive, on a particular CC, the TCI configuration 220 in an RRC configuration message, a DCI field of a DCI message, or a MAC-CE message. The UE 115-*a* may then use this particular CC to perform time tracking, frequency tracking and to determine receive and transmit spatial filters. The TCI configuration 220, which may be a TCI state identifier activation/update message) that may carry the information of the cell identifier or BWP identifier where the indication is applied. As such, the configuration is applied on the respective CC. The UE 115-*a* may use this applied CC to perform time tracking, frequency tracking and to determine receive and transmit spatial filters.

Thus, the UE 115-*a* may determine TCI states based on a configuration of a common TCI pool, and the UE 115-*a* may determine spatial filters of one or more of the beams 205. By transmitting the TCI configuration 220, the base station 105-*a* may decrease the amount of signaling overhead used for the UE 115-*a* to determine the spatial filters, and to perform reference signal-based time and frequency tracking for different configured CCs. The decreased signaling may improve efficiency, and decrease potential interference based inefficiencies in communications at the UE 115-*a*.

Figure 3:
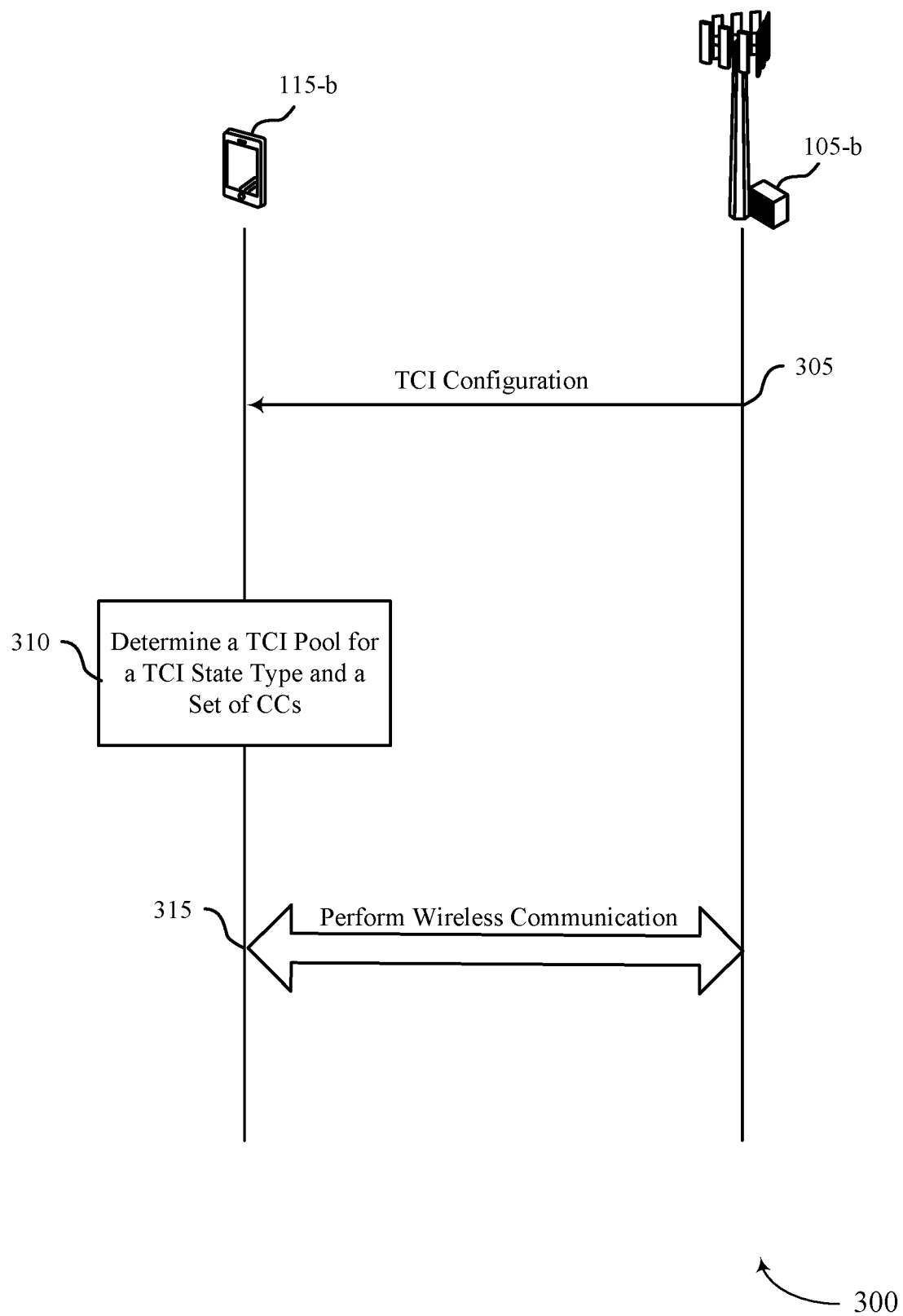
FIG. 3 illustrates an example of a process flow that supports a TCI pool across multiple CCs in accordance with aspects of the present disclosure.

FIG. 3 illustrates an example of a process flow 300 that supports a TCI pool across multiple CCs in accordance with aspects of the present disclosure. The process flow 300 may implement aspects of the wireless communications systems 100 and 200 described with reference to FIGS. 1 and 2, respectively. For example, the process flow 300 may be based on a configuration by a base station 105-*b* or a UE 115-*b*, and implemented by the UE 115-*b*. The base station 105-*a* and the UE 115-*b* may be examples of a base station and a UE, as described with reference to FIGS. 1 and 2, respectively. In the following description of the process flow 300, the operations between the base station 105-*b* and the UE 115-*b* may be transmitted in a different order than the example order shown, or the operations performed by the base station 105-*b* and the UE 115-*b* may be performed in different orders or at different times. Some operations may also be omitted from the process flow 300, and other operations may be added to the process flow 300.

At 305, the UE 115-*b* may receive a message including a TCI configuration from the base station 105-*b*. In some cases, the UE 115-*b* may receive, from the base station 105-*b*, an indication of a TCI state identifier that may be associated with the TCI pool common to the set of TCI state types. In some cases, the UE 115-*b* may receive the indication in an RRC message, a DCI message, or a MAC-CE message. At 310, the UE 115-*b* may determine, based on the TCI configuration, a TCI pool for a TCI state type of a set of TCI state types, and a set of CCs. The set of CCs may correspond to a configured CC list. The TCI state may identify the configured CC list. In some cases, the TCI pool for the TCI state type may be common for the set of CCs. In some cases, each TCI state type of the set of TCI state types may share the TCI pool. In these cases, each TCI state type of the set of TCI state types may correspond to different subsets of TCI indices per TCI state type. UE 115-*b* may determine that the set of CCs may correspond to the configured CC list based on the received message being an RRC message, a DCI message, or a MAC-CE message. Each TCI state type of the sets of TCI state types may correspond to a separate TCI pool. In some cases, the set of TCI state types may include a joint downlink and uplink TCI, a downlink common beam TCI, an uplink common beam TCI, a downlink channel TCI, or an uplink channel TCI, or a combination of these. The UE 115-*b* may verify a beam identifier and a set of tracking reference signal identifiers based on the received indication of the TCI state identifier associated with the TCI pool common to the set of TCI state types.

The UE 115-*b* may determine a set of reference signal identifiers per CC of the set of CCs based on the received indication of the TCI state identifier associated with the TCI pool common to the set of TCI state types. The UE 115-*b* may determine a set of reference signals based on the set of reference signal identifiers per CC of the set of CCs. The UE 115-*b* may perform time and frequency tracking using the set of reference signals associated with the same set of reference signal identifiers per CC of the set of CCs. The UE 115-*b* may also determine a set of reference signals based on the set of reference signal identifiers per CC of the set of CCs, and the UE 115-*b* may perform time and frequency tracking using a set of reference signals associated with the same set of tracking reference signal identifiers on a reference CC of the set of CCs. Additionally, or alternatively, the UE 115-*b* may determine a filter parameter for a receiver chain or a transmitter chain associated with the same set of reference signal identifiers per CC of the set of CCs. The UE 115-*b* may also determine a filter parameter for a receiver chain or a transmitter chain associated with the UE 115-*b* based on measuring a set of reference signals associated with the same set of tracking reference signal identifiers on a reference CC of the set of CCs.

At 315, the UE 115-*b* may perform the wireless communication via a directional beam based on the TCI pool for the TCI state type and the set of CCs. The base station 105-*b* may also perform the wireless communication via a directional beam based on the TCI indicator pool for the TCI state type and the set of CCs. In these cases, the UE 115-*b* may activate the directional beam based on the received indication of the TCI state identifier associated with the TCI pool common to the set of TCI state types. The wireless communication via the directional beam may be based on the activated directional beam. The UE 115-*b* may also update the directional beam based on the received indication of the TCI state identifier associated with the TCI pool common to the set of TCI state types. In these cases, the wireless communication via the directional beam may be based on the updated directional beam.

Figure 4:
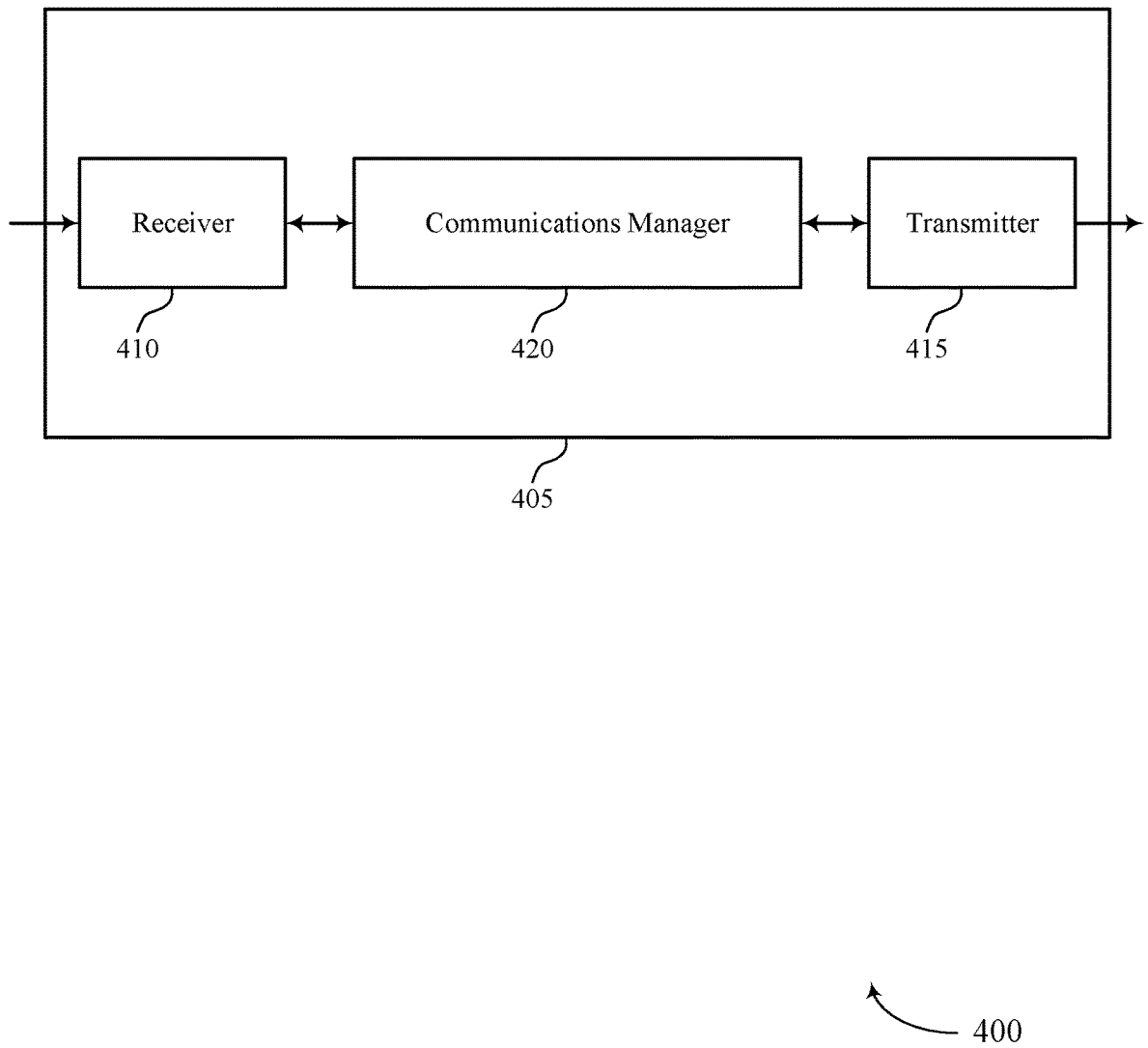
FIGS. 4 and 5 show block diagrams of devices that support a TCI pool across multiple CCs in accordance with aspects of the present disclosure.

FIG. 4 shows a block diagram 400 of a device 405 that supports a TCI pool across multiple CCs in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to a TCI pool across multiple CCs). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to a TCI pool across multiple CCs). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of a TCI pool across multiple CCs as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving a message including a TCI configuration. The communications manager 420 may be configured as or otherwise support a means for determining, based on the TCI configuration, a TCI pool for a TCI state type of a set of TCI state types and a set of CCs. The communications manager 420 may be configured as or otherwise support a means for performing the wireless communication via a directional beam based on the TCI pool for the TCI state type and the set of CCs.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for more efficient utilization of communication resources, as the device 405 may receive, via receiver 410, decreased signaling that may provide the information for the device 405 to determine a TCI pool for a set of CCs, and efficiently perform beamforming communications.

Figure 5:
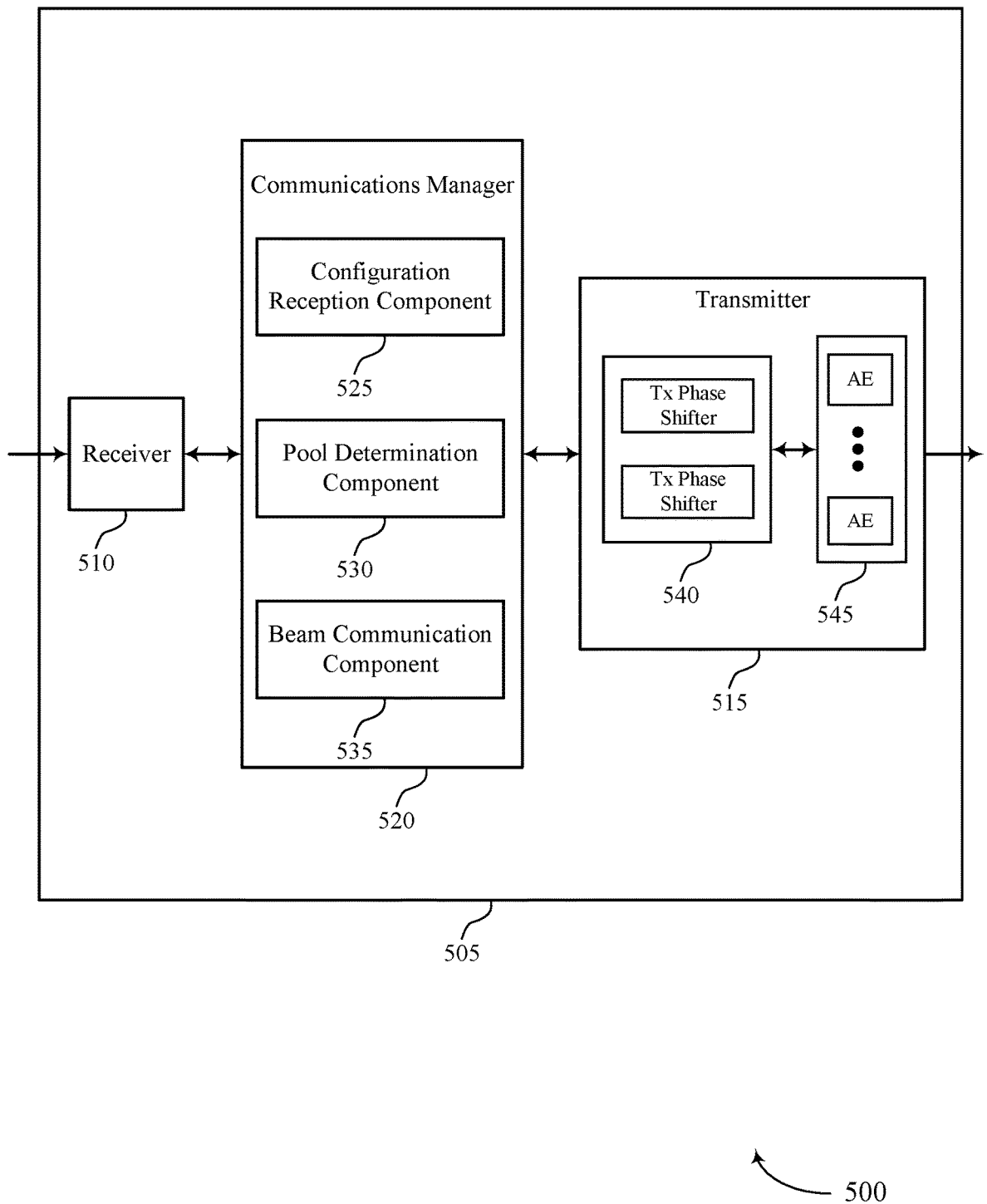

FIG. 5 shows a block diagram 500 of a device 505 that supports a TCI pool across multiple CCs in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to a TCI pool across multiple CCs). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to a TCI pool across multiple CCs). In some examples, the transmitter 515 may be co-located with a receiver 510 in a transceiver module. The transmitter 515 may include one or more phase shifters 540 and one or more antenna elements 850. The transmitter 515 may utilize a single antenna or a set of multiple antennas.

A phase shifter 540 may provide a configurable phase shift or phase offset to a corresponding radio frequency signal to be transmitted on a respective antenna element 545. The settings of each of the phase shifters 540 may be independent, meaning that each can be set to provide a desired amount of phase shift or the same amount of phase shift or some other configuration. A modem or other processor may have at least one control line connected to each of the phase shifters 540 and which may be used to configure the phase shifters 540 to provide a desired amounts of phase shift or phase offset between antenna elements 545.

In at least one embodiment, changing or receiving a transmit or receive beam comprises adjusting relative phase shifts for signals on different antenna elements 545. The relative phase shifts may be achieved by the modem adjusting the phase shift of the one or more phase shifters 540. The set of phases for different phase shifters 540 (and corresponding antenna elements 545) may comprise the spatial receive parameters or spatial transmit parameters for a respective beam. To receive or transmit on a beam, the spatial parameters may need to be set before the beginning of the transmitting or receiving.

The device 505, or various components thereof, may be an example of means for performing various aspects of a TCI pool across multiple CCs as described herein. For example, the communications manager 520 may include a configuration reception component 525, a pool determination component 530, a beam communication component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The configuration reception component 525 may be configured as or otherwise support a means for receiving a message including a TCI configuration. The pool determination component 530 may be configured as or otherwise support a means for determining, based on the TCI configuration, a TCI pool for a TCI state type of a set of TCI state types and a set of CCs. The beam communication component 535 may be configured as or otherwise support a means for performing the wireless communication via a directional beam based on the TCI pool for the TCI state type and the set of CCs.

Figure 6:
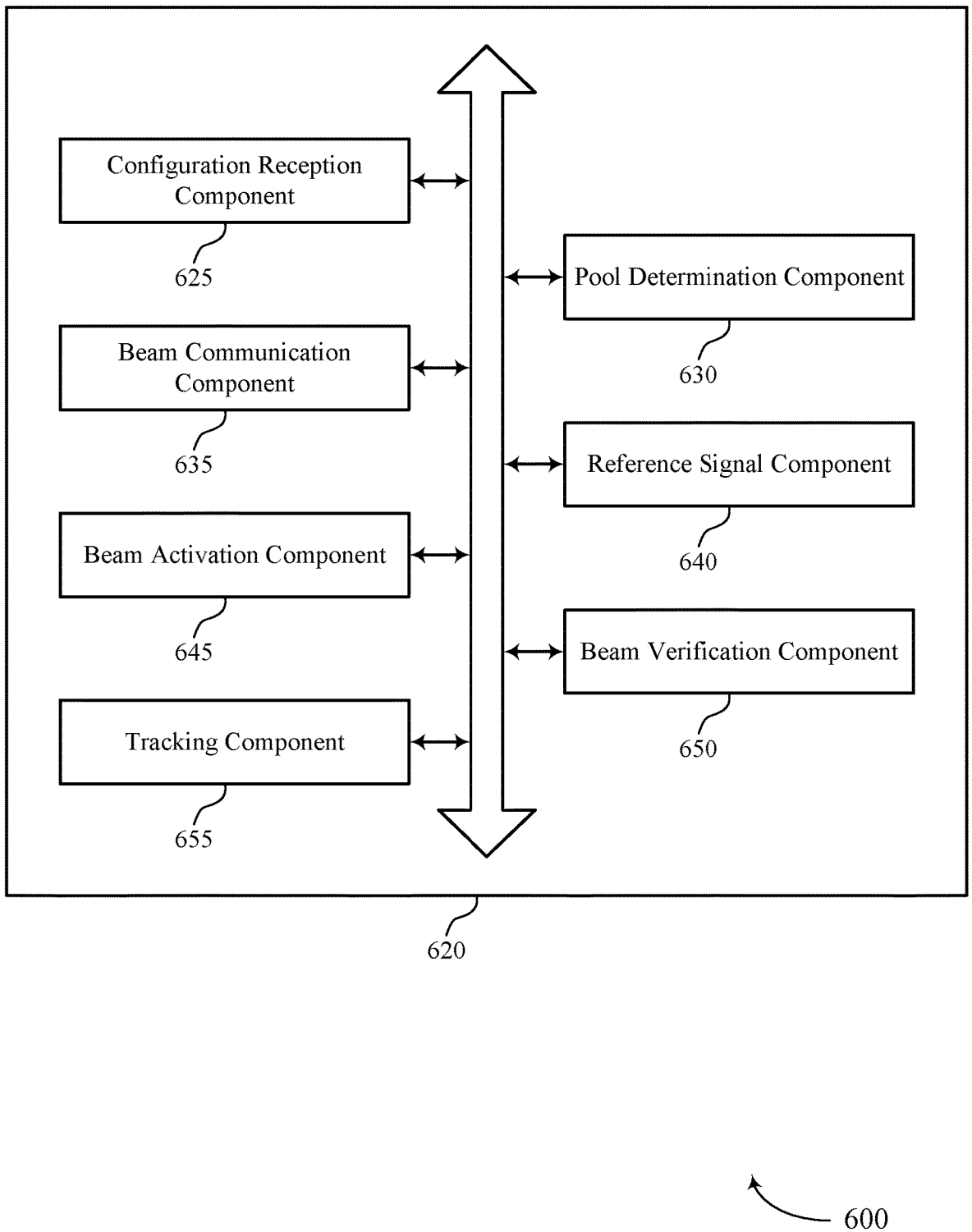
FIG. 6 shows a block diagram of a communications manager that supports a TCI pool across multiple CCs in accordance with aspects of the present disclosure.

FIG. 6 shows a block diagram 600 of a communications manager 620 that supports a TCI pool across multiple CCs in accordance with aspects of the present disclosure. The communications manager 620 may be an example of aspects of a communications manager 420, a communications manager 520, or both, as described herein. The communications manager 620, or various components thereof, may be an example of means for performing various aspects of a TCI pool across multiple CCs as described herein. For example, the communications manager 620 may include a configuration reception component 625, a pool determination component 630, a beam communication component 635, a reference signal component 640, a beam activation component 645, a beam verification component 650, a tracking component 655, or any combination thereof. Each of these components may communicate, directly or indirectly, with one another (e.g., via one or more buses).

The communications manager 620 may support wireless communication at a UE in accordance with examples as disclosed herein. The configuration reception component 625 may be configured as or otherwise support a means for receiving a message including a TCI configuration. The pool determination component 630 may be configured as or otherwise support a means for determining, based on the TCI configuration, a TCI pool for a TCI state type of a set of TCI state types and a set of CCs. The beam communication component 635 may be configured as or otherwise support a means for performing the wireless communication via a directional beam based on the TCI pool for the TCI state type and the set of CCs.

In some examples, the TCI pool for the TCI state type is common for the set of CCs. In some examples, each TCI state type of the set of TCI state types share the TCI pool. In some examples, each TCI state type of the set of TCI state types corresponds to different subsets of TCI indices per TCI state type. In some examples, each TCI state type of the set of TCI state types corresponds to a separate TCI pool. In some examples, the set of TCI state types includes a joint downlink and uplink TCI, a downlink common beam TCI, an uplink common beam TCI, a downlink channel TCI, or an uplink channel TCI, or a combination thereof.

The configuration reception component 625 may be configured as or otherwise support a means for receiving an indication of a TCI state identifier associated with the TCI pool common to the set of TCI state types. In some examples, the beam activation component 645 may be configured as or otherwise support a means for activating the directional beam based on the received indication of the TCI state identifier associated with the TCI pool common to the set of TCI state types, where the wireless communication via the directional beam is based on the activated directional beam. In some examples, the beam activation component 645 may be configured as or otherwise support a means for updating the directional beam based on the received indication of the TCI state identifier associated with the TCI pool common to the set of TCI state types, where the wireless communication via the directional beam is based on the updated directional beam.

The beam verification component 650 may be configured as or otherwise support a means for verifying a beam identifier and a set of tracking reference signal identifiers based on the received indication of the TCI state identifier associated with the TCI pool common to the set of TCI state types. In some examples, the configuration reception component 625 may be configured as or otherwise support a means for receiving the indication in an RRC message, a DCI message, or a MAC-CE message. In some examples, the reference signal component 640 may be configured as or otherwise support a means for determining a set of reference signal identifiers per CC of the set of CCs based on the received indication of the TCI state identifier associated with the TCI pool common to the set of TCI state types.

In some examples, the reference signal component 640 may be configured as or otherwise support a means for determining a set of reference signals based on the set of reference signal identifiers per CC of the set of CCs. In some examples, the tracking component 655 may be configured as or otherwise support a means for performing time and frequency tracking using the set of reference signals associated with the same set of reference signal identifiers per CC of the set of CCs. In some examples, the reference signal component 640 may be configured as or otherwise support a means for determining a set of reference signals based on the set of reference signal identifiers per CC of the set of CCs. In some examples, the tracking component 655 may be configured as or otherwise support a means for performing time and frequency tracking using a set of reference signals associated with the same set of tracking reference signal identifiers on a reference CC of the set of CCs.

The reference signal component 640 may be configured as or otherwise support a means for determining a filter parameter for a receiver chain or a transmitter chain associated with the UE based on measuring a set of reference signals associated with the same set of reference signal identifiers per CC of the set of CCs. In some examples, the reference signal component 640 may be configured as or otherwise support a means for determining a filter parameter for a receiver chain or a transmitter chain associated with the UE based on measuring a set of reference signals associated with the same set of tracking reference signal identifiers on a reference CC of the set of CCs. In some examples, the set of CCs corresponds to a configured CC list. In some examples, the TCI state identifies the configured CC list. The configuration reception component 625 may be configured as or otherwise support a means for determining that the set of CCs corresponds to the configured CC list based on the received message including an RRC message, a DCI message, or a MAC-CE message.

Figure 7:
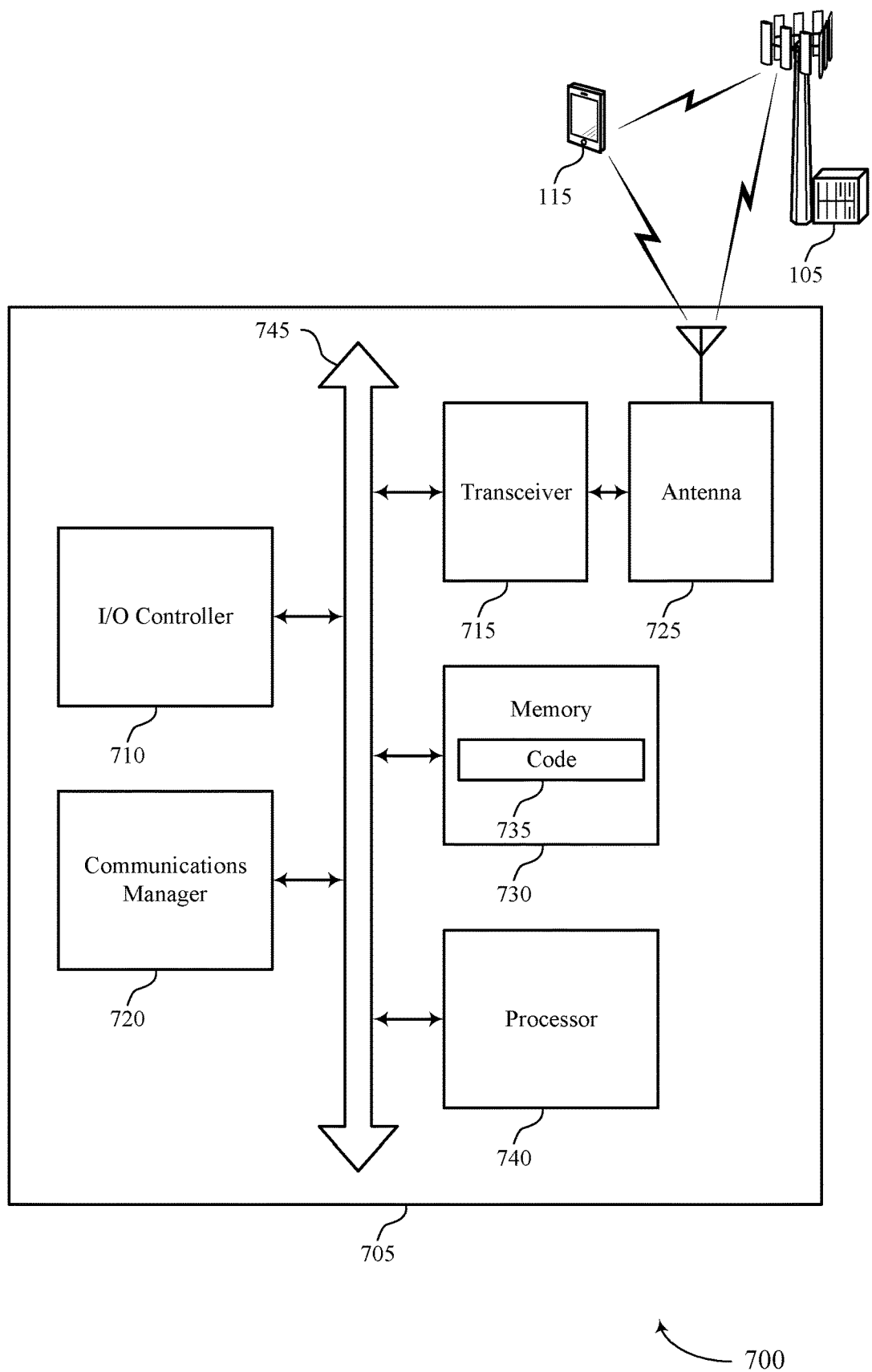
FIG. 7 shows a diagram of a system including a device that supports a TCI pool across multiple CCs in accordance with aspects of the present disclosure.

FIG. 7 shows a diagram of a system 700 including a device 705 that supports a TCI pool across multiple CCs in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting a TCI pool across multiple CCs). For example, the device 705 or a component of the device 705 may include a processor 740 and memory 730 coupled with the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving a message including a TCI configuration. The communications manager 720 may be configured as or otherwise support a means for determining, based on the TCI configuration, a TCI pool for a TCI state type of a set of TCI state types and a set of CCs. The communications manager 720 may be configured as or otherwise support a means for performing the wireless communication via a directional beam based on the TCI pool for the TCI state type and the set of CCs. By including or configuring the communications manager 720 in accordance with examples as described herein, the device 705 may support techniques for more efficient utilization of communication resources and improved coordination between devices, as communications manager 720 may facilitate reception of efficient communication signaling from a base station 105 indicating a TCI pool.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of a TCI pool across multiple CCs as described herein, or the processor 740 and the memory 730 may be otherwise configured to perform or support such operations.

Figure 8:
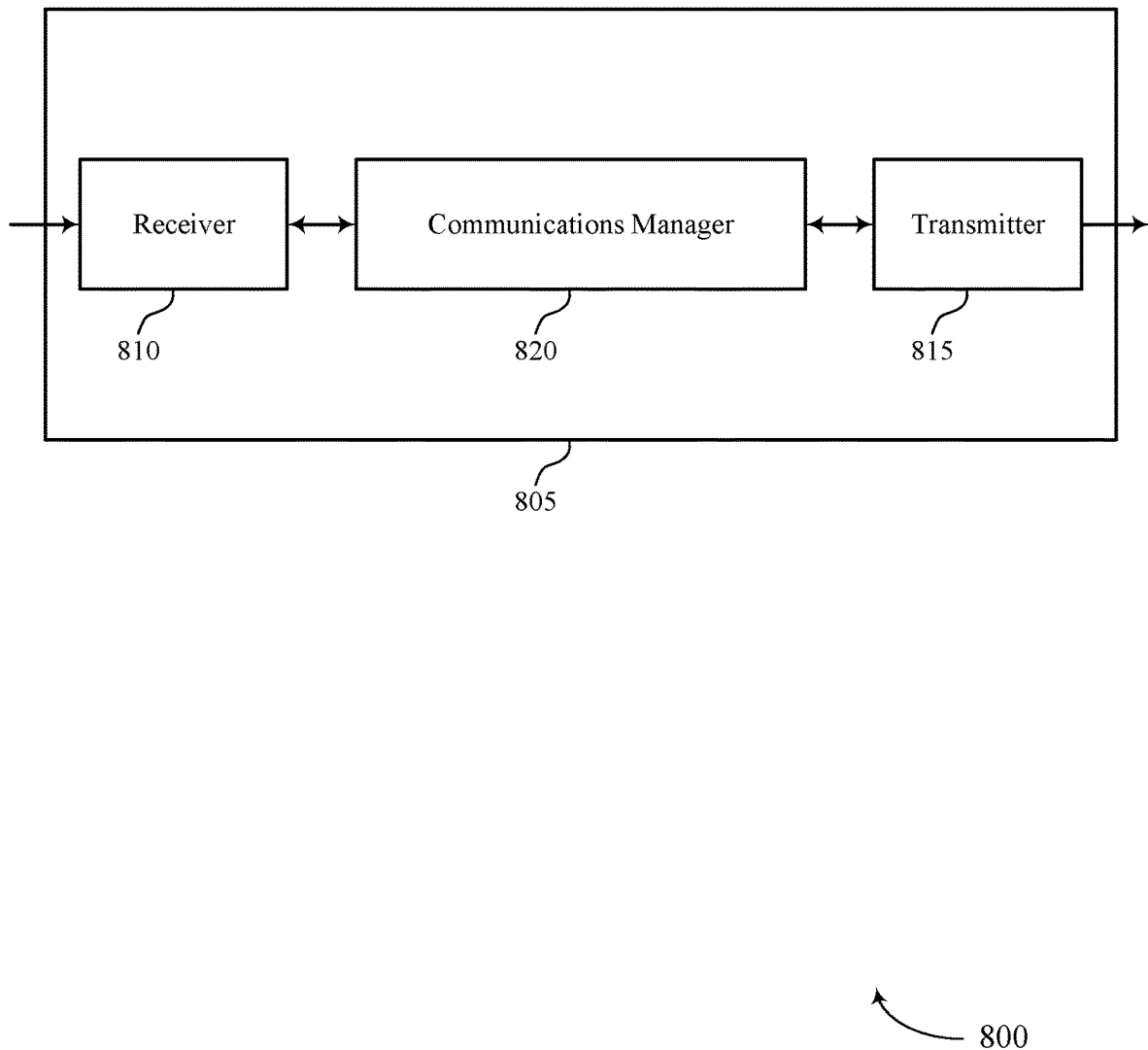
FIGS. 8 and 9 show block diagrams of devices that support a TCI pool across multiple CCs in accordance with aspects of the present disclosure.

FIG. 8 shows a block diagram 800 of a device 805 that supports a TCI pool across multiple CCs in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to a TCI pool across multiple CCs). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to a TCI pool across multiple CCs). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of a TCI pool across multiple CCs as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

For example, the communications manager 820 may be configured as or otherwise support a means for transmitting a message including a TCI configuration, the TCI configuration including a TCI pool for a TCI state type of a set of TCI state types and a set of CCs. The communications manager 820 may be configured as or otherwise support a means for performing the wireless communication via a directional beam based on the TCI pool for the TCI state type and the set of CCs. By including or configuring the communications manager 820 in accordance with examples as described herein, the device 805 (e.g., a processor controlling or otherwise coupled with the receiver 810, the transmitter 815, the communications manager 820, or a combination thereof) may support techniques for more efficient utilization of communication resources, as device 805 may receive, via receiver 810, an indication of a TCI state pool configuration, which may decrease overhead signaling and improve communications efficiency.

Figure 9:
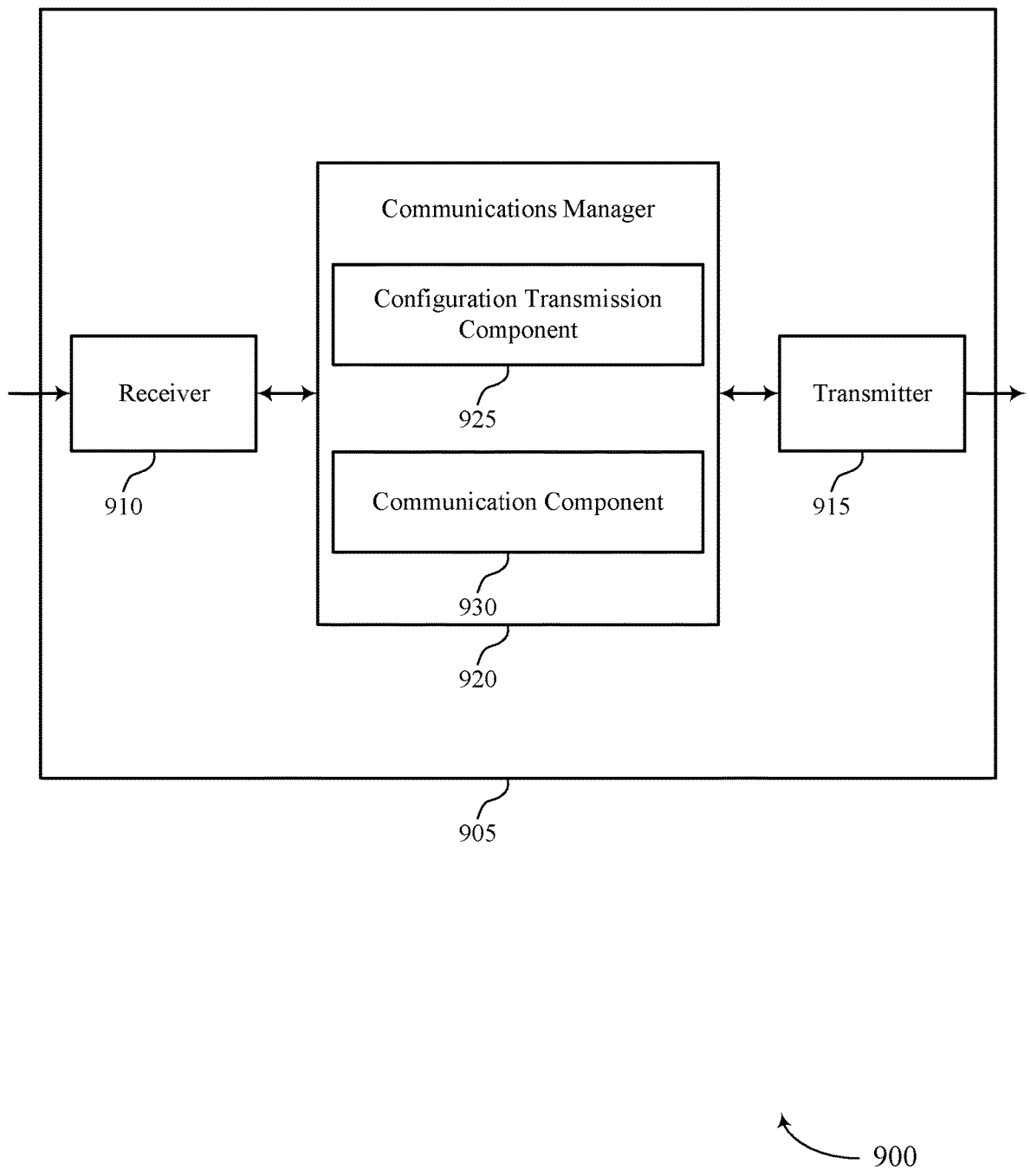

FIG. 9 shows a block diagram 900 of a device 905 that supports a TCI pool across multiple CCs in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to a TCI pool across multiple CCs). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to a TCI pool across multiple CCs). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of a TCI pool across multiple CCs as described herein. For example, the communications manager 920 may include a configuration transmission component 925 a communication component 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The configuration transmission component 925 may be configured as or otherwise support a means for transmitting a message including a TCI configuration, the TCI configuration including a TCI pool for a TCI state type of a set of TCI state types and a set of CCs. The communication component 930 may be configured as or otherwise support a means for performing the wireless communication via a directional beam based on the TCI pool for the TCI state type and the set of CCs.

Figure 10:
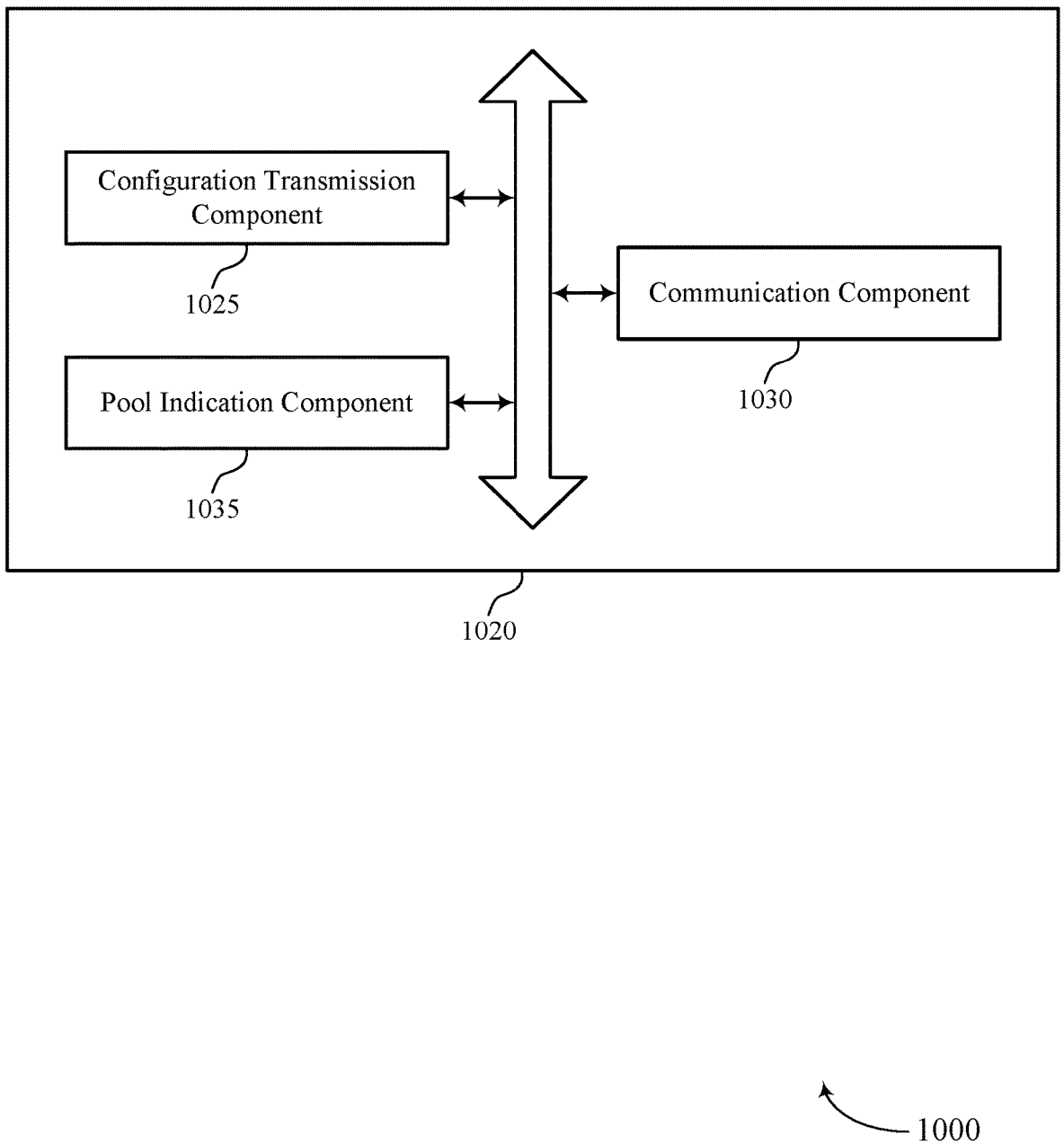
FIG. 10 shows a block diagram of a communications manager that supports a TCI pool across multiple CCs in accordance with aspects of the present disclosure.

FIG. 10 shows a block diagram 1000 of a communications manager 1020 that supports a TCI pool across multiple CCs in accordance with aspects of the present disclosure. The communications manager 1020 may be an example of aspects of a communications manager 820, a communications manager 920, or both, as described herein. The communications manager 1020, or various components thereof, may be an example of means for performing various aspects of a TCI pool across multiple CCs as described herein. For example, the communications manager 1020 may include a configuration transmission component 1025, a communication component 1030, a pool indication component 1035, or any combination thereof. Each of these components may communicate, directly or indirectly, with one another (e.g., via one or more buses).

The configuration transmission component 1025 may be configured as or otherwise support a means for transmitting a message including a TCI configuration, the TCI configuration including a TCI pool for a TCI state type of a set of TCI state types and a set of CCs. The communication component 1030 may be configured as or otherwise support a means for performing the wireless communication via a directional beam based on the TCI pool for the TCI state type and the set of CCs.

The TCI pool for the TCI state type is common for the set of CCs. In some examples, each TCI state type of the set of TCI state types share the TCI pool. In some examples, each TCI state type of the set of TCI state types corresponds to different subsets of TCI indices per TCI state type. In some examples, each TCI state type of the set of TCI state types corresponds to a separate TCI pool. In some examples, the set of TCI state types includes a joint downlink and uplink TCI, a downlink common beam TCI, an uplink common beam TCI, a downlink channel TCI, or an uplink channel TCI, or a combination thereof.

The pool indication component 1035 may be configured as or otherwise support a means for transmitting an indication of a TCI state identifier associated with the TCI pool common to the set of TCI state types. In some examples, the indication is transmitted in an RRC message, a DCI message, or a MAC-CE message. In some examples, the set of CCs corresponds to a configured CC list. In some examples, the TCI state identifies the configured CC list.

Figure 11:
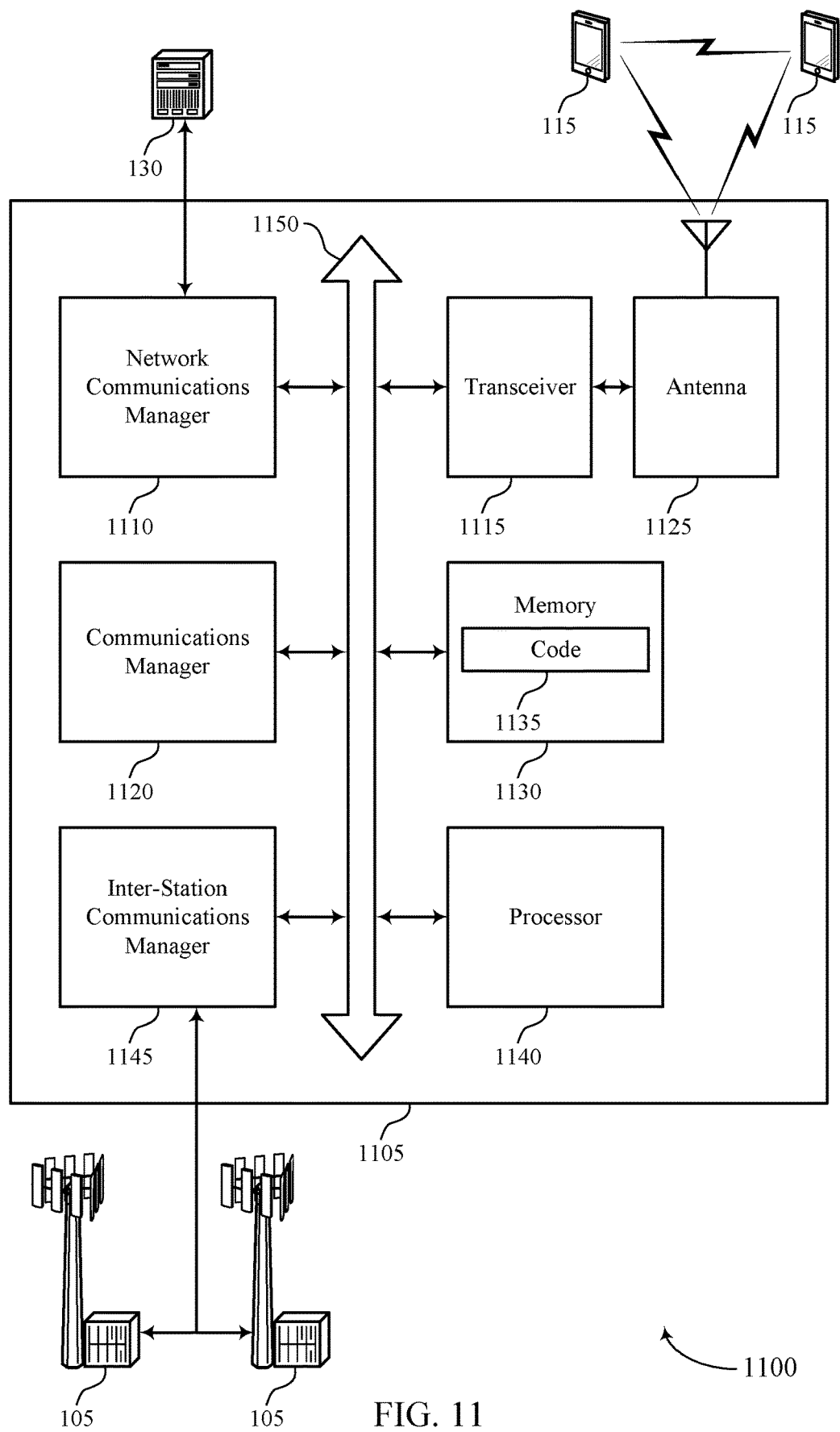
FIG. 11 shows a diagram of a system including a device that supports a TCI pool across multiple CCs in accordance with aspects of the present disclosure.

FIG. 11 shows a diagram of a system 1100 including a device 1105 that supports a TCI pool across multiple CCs in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting a TCI pool across multiple CCs). For example, the device 1105 or a component of the device 1105 may include a processor 1140 and memory 1130 coupled with the processor 1140, the processor 1140 and memory 1130 configured to perform various functions described herein.

The inter-station communications manager 1145 may manage communications with other base stations 105 and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

For example, the communications manager 1120 may be configured as or otherwise support a means for transmitting a message including a TCI configuration, the TCI configuration including a TCI pool for a TCI state type of a set of TCI state types and a set of CCs. The communications manager 1120 may be configured as or otherwise support a means for performing the wireless communication via a directional beam based on the TCI pool for the TCI state type and the set of CCs. By including or configuring the communications manager 1120 in accordance with examples as described herein, the device 1105 may support techniques for more efficient utilization of communication resources, as the device 1105 may receive efficient communication signaling indicating the TCI state pool, which may enable the device 1105 to determination spatial filters and tracking efficiently.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of TCI pool across multiple CCs as described herein, or the processor 1140 and the memory 1130 may be otherwise configured to perform or support such operations.

Figure 12:
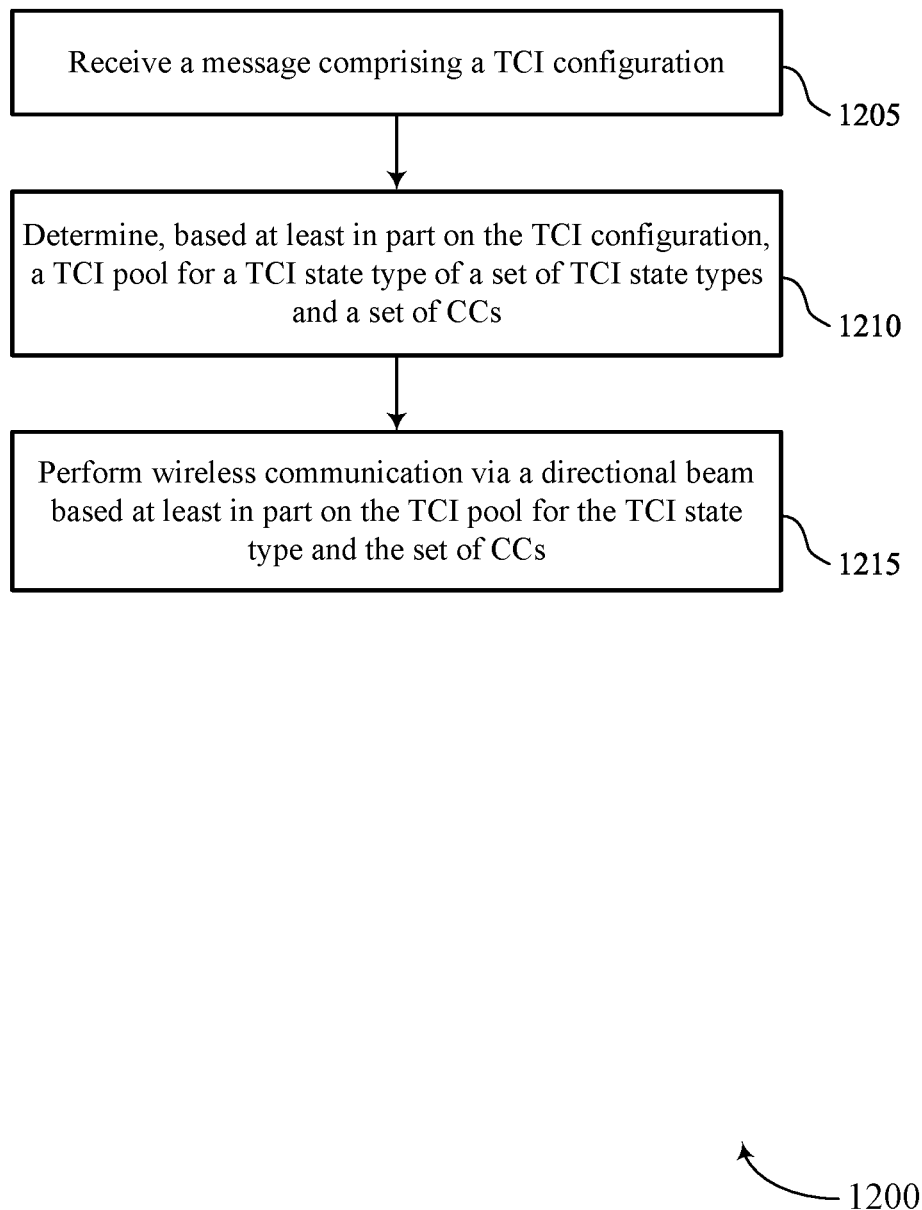
FIGS. 12 through 15 show flowcharts illustrating methods that support a TCI pool across multiple CCs in accordance with aspects of the present disclosure.

FIG. 12 shows a flowchart illustrating a method 1200 that supports a TCI pool across multiple CCs in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving a message including a TCI configuration. The operations of 1205 may be performed in accordance with examples as disclosed herein. In some examples, aspects of the operations of 1205 may be performed by a configuration reception component 625 as described with reference to FIG. 6.

At 1210, the method may include determining, based on the TCI configuration, a TCI pool for a TCI state type of a set of TCI state types and a set of CCs. The operations of 1210 may be performed in accordance with examples as disclosed herein. In some examples, aspects of the operations of 1210 may be performed by a pool determination component 630 as described with reference to FIG. 6.

At 1215, the method may include performing the wireless communication via a directional beam based on the TCI pool for the TCI state type and the set of CCs. The operations of 1215 may be performed in accordance with examples as disclosed herein. In some examples, aspects of the operations of 1215 may be performed by a beam communication component 635 as described with reference to FIG. 6.

Figure 13:
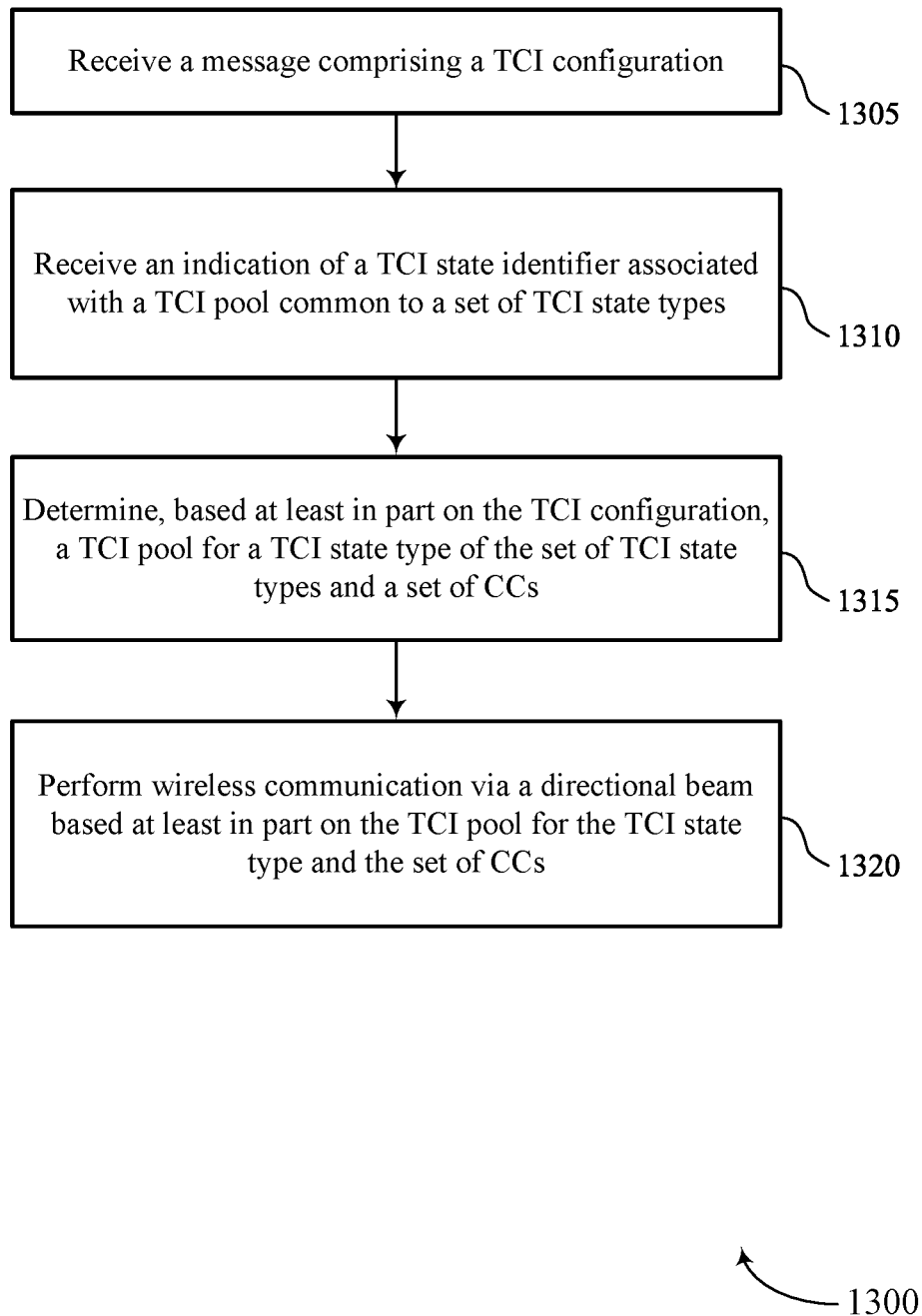

FIG. 13 shows a flowchart illustrating a method 1300 that supports a TCI pool across multiple CCs in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving a message including a TCI configuration. The operations of 1305 may be performed in accordance with examples as disclosed herein. In some examples, aspects of the operations of 1305 may be performed by a configuration reception component 625 as described with reference to FIG. 6.

At 1310, the method may include receiving an indication of a TCI state identifier associated with a TCI pool common to a set of TCI state types. The operations of 1310 may be performed in accordance with examples as disclosed herein. In some examples, aspects of the operations of 1310 may be performed by a configuration reception component 625 as described with reference to FIG. 6.

At 1315, the method may include determining, based on the TCI configuration, a TCI pool for a TCI state type of the set of TCI state types and a set of CCs. The operations of 1315 may be performed in accordance with examples as disclosed herein. In some examples, aspects of the operations of 1315 may be performed by a pool determination component 630 as described with reference to FIG. 6.

At 1320, the method may include performing the wireless communication via a directional beam based on the TCI pool for the TCI state type and the set of CCs. The operations of 1320 may be performed in accordance with examples as disclosed herein. In some examples, aspects of the operations of 1320 may be performed by a beam communication component 635 as described with reference to FIG. 6.

Figure 14:
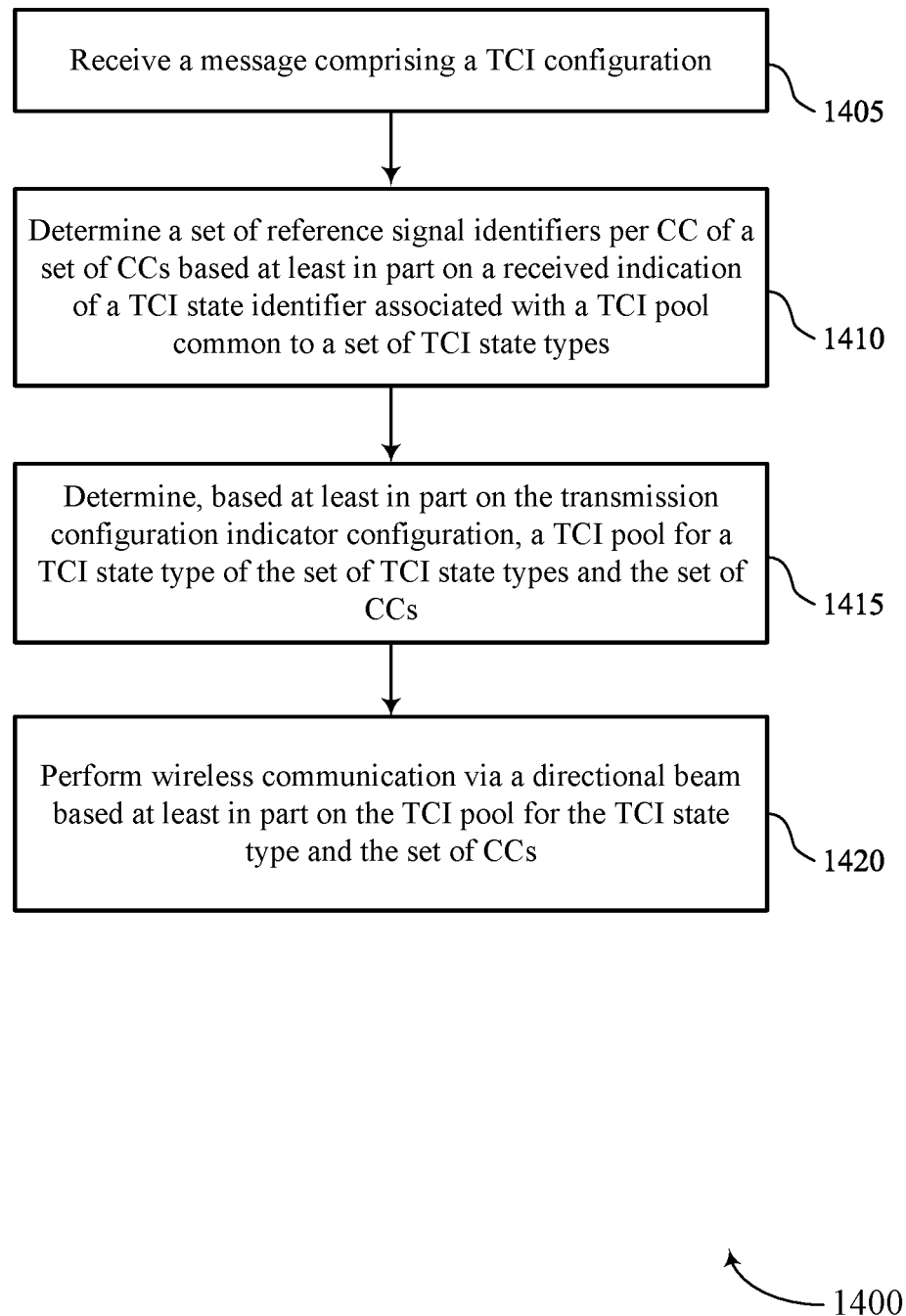

FIG. 14 shows a flowchart illustrating a method 1400 that supports a TCI pool across multiple CCs in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions.

Additionally, or alternatively, the UE may perform aspects of the described functions using special-purpose hardware.

At 1405, the method may include receiving a message including a TCI configuration. The operations of 1405 may be performed in accordance with examples as disclosed herein. In some examples, aspects of the operations of 1405 may be performed by a configuration reception component 625 as described with reference to FIG. 6.

At 1410, the method may include determining a set of reference signal identifiers per CC of a set of CCs based on a received indication of a TCI state identifier associated with a TCI pool common to a set of TCI state types. The operations of 1410 may be performed in accordance with examples as disclosed herein. In some examples, aspects of the operations of 1410 may be performed by a reference signal component 640 as described with reference to FIG. 6.

At 1415, the method may include determining, based on the TCI configuration, a TCI pool for a TCI state type of the set of TCI state types and the set of CCs. The operations of 1415 may be performed in accordance with examples as disclosed herein. In some examples, aspects of the operations of 1415 may be performed by a pool determination component 630 as described with reference to FIG. 6.

At 1420, the method may include performing the wireless communication via a directional beam based on the TCI pool for the TCI state type and the set of CCs. The operations of 1420 may be performed in accordance with examples as disclosed herein. In some examples, aspects of the operations of 1420 may be performed by a beam communication component 635 as described with reference to FIG. 6.

Figure 15:
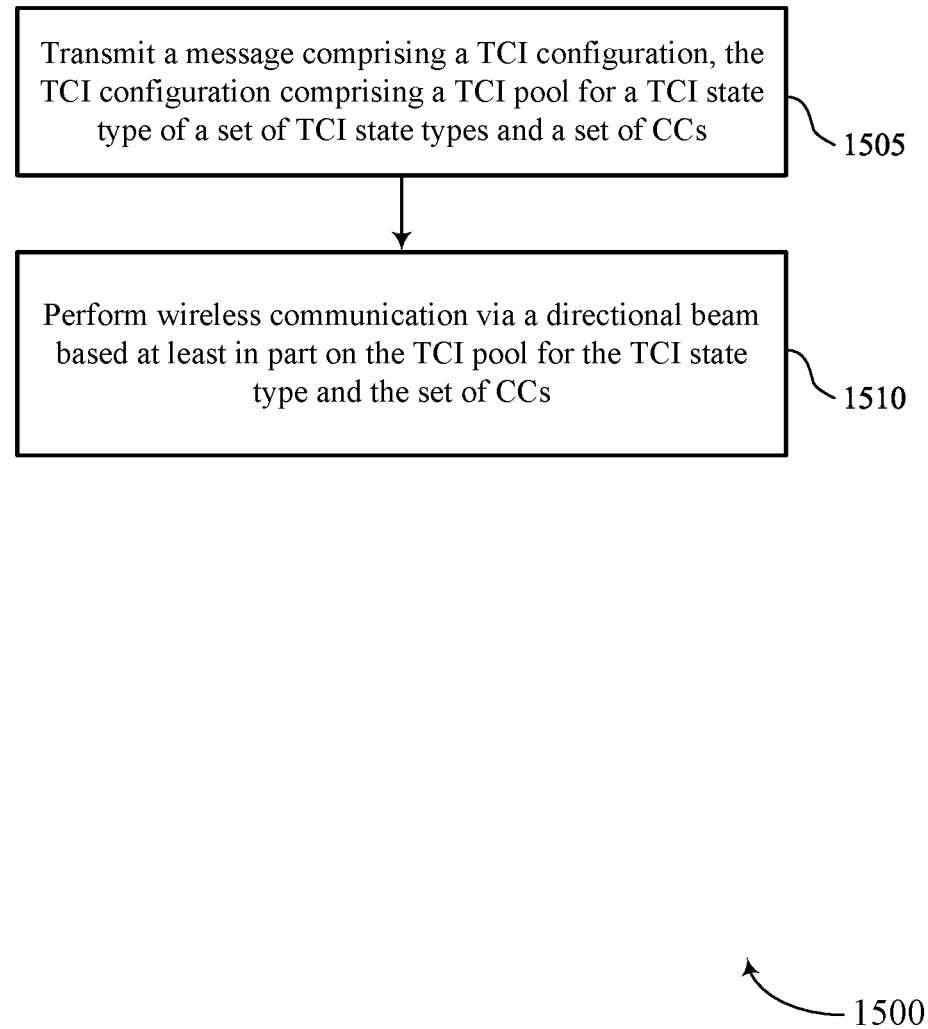

FIG. 15 shows a flowchart illustrating a method 1500 that supports a TCI pool across multiple CCs in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally, or alternatively, the base station may perform aspects of the described functions using special-purpose hardware.

At 1505, the method may include transmitting a message including a TCI configuration, the TCI configuration including a TCI pool for a TCI state type of a set of TCI state types and a set of CCs. The operations of 1505 may be performed in accordance with examples as disclosed herein. In some examples, aspects of the operations of 1505 may be performed by a configuration transmission component 1025 as described with reference to FIG. 10.

At 1510, the method may include performing the wireless communication via a directional beam based on the TCI pool for the TCI state type and the set of CCs. The operations of 1510 may be performed in accordance with examples as disclosed herein. In some examples, aspects of the operations of 1510 may be performed by a communication component 1030 as described with reference to FIG. 10.

The following provides an overview of aspects of the present disclosure:

Aspect 1: A method for wireless communication at a UE, comprising: receiving a message comprising a TCI configuration; determining, based at least in part on the TCI configuration, a TCI pool for a TCI state type of a set of TCI state types and a set of CCs; and performing the wireless communication via a directional beam based at least in part on the TCI pool for the TCI state type and the set of CCs.

Aspect 2: The method of aspect 1, wherein the TCI pool for the TCI state type is common for the set of CCs.

Aspect 3: The method of any of aspects 1 through 2, wherein each TCI state type of the set of TCI state types shares the TCI pool and corresponds to different subsets of TCI indices per TCI state type Aspect 5: The method of any of aspects 1 through 4, wherein each TCI state type of the set of TCI state types corresponds to a separate TCI pool.

Aspect 6: The method of any of aspects 1 through 5, wherein the set of TCI state types comprises one or more of a joint downlink and uplink TCI, a downlink common beam TCI, an uplink common beam TCI, a downlink channel TCI, or an uplink channel TCI.

Aspect 7: The method of any of aspects 1 through 6, further comprising: receiving an indication of a TCI state identifier associated with the TCI pool common to the set of TCI state types.

Aspect 8: The method of aspect 7, further comprising: activating the directional beam based at least in part on the received indication of the TCI state identifier associated with the TCI pool common to the set of TCI state types, wherein the wireless communication via the directional beam is based at least in part on the activated directional beam.

Aspect 9: The method of any of aspects 7 through 8, further comprising: updating the directional beam based at least in part on the received indication of the TCI state identifier associated with the TCI pool common to the set of TCI state types, wherein the wireless communication via the directional beam is based at least in part on the updated directional beam.

Aspect 10: The method of any of aspects 7 through 9, further comprising: verifying a beam identifier and a set of tracking reference signal identifiers based at least in part on the received indication of the TCI state identifier associated with the TCI pool common to the set of TCI state types.

Aspect 11: The method of any of aspects 7 through 10, further comprising: receiving the indication in an RRC message, a DCI message, or a MAC-CE message.

Aspect 12: The method of any of aspects 1 through 11, further comprising: receiving an indication of a TCI state identifier associated with the TCI pool common to the set of TCI state types; and determining a set of reference signal identifiers per CC of the set of CCs based at least in part on the received indication of the TCI state identifier associated with the TCI pool common to the set of TCI state types.

Aspect 13: The method of aspect 12, further comprising: determining a set of reference signals based at least in part on the set of reference signal identifiers per CC of the set of CCs; and performing time and frequency tracking using the set of reference signals associated with the set of reference signal identifiers per CC of the set of CCs.

Aspect 14: The method of any of aspects 12 through 13, further comprising: determining a set of reference signals based at least in part on the set of reference signal identifiers per CC of the set of CCs; and performing time and frequency tracking using the set of reference signals associated with the set of tracking reference signal identifiers on a reference CC of the set of CCs.

Aspect 15: The method of any of aspects 12 through 14, further comprising: determining a filter parameter for a receiver chain or a transmitter chain associated with the UE based at least in part on measuring a set of reference signals associated with the set of reference signal identifiers per CC of the set of CCs.

Aspect 16: The method of any of aspects 12 through 15, further comprising: determining a filter parameter for a receiver chain or a transmitter chain associated with the UE based at least in part on measuring a set of reference signals associated with the set of reference signal identifiers on a reference CC of the set of CCs.

Aspect 17: The method of any of aspects 1 through 16, wherein the set of CCs corresponds to a configured CC list.

Aspect 18: The method of aspect 17, wherein the TCI state identifies the configured CC list.

Aspect 19: The method of any of aspects 17 through 18, further comprising: determining that the set of CCs corresponds to a configured CC list based at least in part on the received message comprising an RRC message, a DCI message, or a MAC-CE message.

Aspect 20: A method of wireless communication at a base station, comprising: transmitting a message comprising a TCI configuration, the TCI configuration comprising a TCI pool for a TCI state type of a set of TCI state types and a set of CCs; and performing the wireless communication via a directional beam based at least in part on the TCI pool for the TCI state type and the set of CCs.

Aspect 21: The method of aspect 20, wherein the TCI pool for the TCI state type is common for the set of CCs.

Aspect 22: The method of any of aspects 20 through 21, wherein each TCI state type of the set of TCI state types shares the TCI pool and corresponds to different subsets of TCI indices per TCI state type.

Aspect 24: The method of any of aspects 20 through 23, wherein each TCI state type of the set of TCI state types corresponds to a separate TCI pool.

Aspect 25: The method of any of aspects 20 through 24, wherein the set of TCI state types comprises one or more of a joint downlink and uplink TCI, a downlink common beam TCI, an uplink common beam TCI, a downlink channel TCI, or an uplink channel TCI.

Aspect 26: The method of any of aspects 20 through 25, further comprising: transmitting an indication of a TCI state identifier associated with the TCI pool common to the set of TCI state types.

Aspect 27: The method of aspect 26, wherein the indication is transmitted in an RRC message, a DCI message, or a MAC-CE message.

Aspect 28: The method of any of aspects 20 through 27, wherein the set of CCs corresponds to a configured CC list.

Aspect 29: The method of aspect 28, wherein the TCI state identifies the configured CC list.

Aspect 30: An apparatus for wireless communication at a UE, comprising a processor; memory coupled with the processor; and instructions stored in the memory and executable by the processor to cause the apparatus to perform a method of any of aspects 1 through 19.

Aspect 31: An apparatus for wireless communication at a UE, comprising at least one means for performing a method of any of aspects 1 through 19.

Aspect 32: A non-transitory computer-readable medium storing code for wireless communication at a UE, the code comprising instructions executable by a processor to perform a method of any of aspects 1 through 19.

Aspect 33: An apparatus comprising a processor; memory coupled with the processor; and instructions stored in the memory and executable by the processor to cause the apparatus to perform a method of any of aspects 20 through 29.

Aspect 34: An apparatus comprising at least one means for performing a method of any of aspects 20 through 29.

Aspect 35: A non-transitory computer-readable medium storing code the code comprising instructions executable by a processor to perform a method of any of aspects 20 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving a message comprising a transmission configuration indicator configuration;
   determining, based at least in part on the transmission configuration indicator configuration, a transmission configuration indicator pool for a transmission configuration indicator state type of a set of transmission configuration indicator state types and a set of component carriers; and
   performing the wireless communication via a directional beam based at least in part on the transmission configuration indicator pool for the transmission configuration indicator state type and the set of component carriers.

2. The method of claim 1, further comprising:
   receiving an indication of a transmission configuration indicator state identifier associated with the transmission configuration indicator pool common to the set of transmission configuration indicator state types; and
   determining a set of reference signal identifiers per component carrier of the set of component carriers based at least in part on the received indication of the transmission configuration indicator state identifier associated with the transmission configuration indicator pool common to the set of transmission configuration indicator state types.

3. The method of claim 2, further comprising:
   determining a set of reference signals based at least in part on the set of reference signal identifiers per component carrier of the set of component carriers; and
   performing time and frequency tracking using the set of reference signals associated with the set of reference signal identifiers per component carrier of the set of component carriers.

4. The method of claim 2, further comprising:
   determining a set of reference signals based at least in part on the set of reference signal identifiers per component carrier of the set of component carriers; and
   performing time and frequency tracking using the set of reference signals associated with the set of reference signal identifiers on a reference component carrier of the set of component carriers.

5. The method of claim 2, further comprising:
   determining a filter parameter for a receiver chain or a transmitter chain associated with the UE based at least in part on measuring a set of reference signals associated with the set of reference signal identifiers per component carrier of the set of component carriers.

6. The method of claim 2, further comprising:
   determining a filter parameter for a receiver chain or a transmitter chain associated with the UE based at least in part on measuring a set of reference signals associated with the set of reference signal identifiers on a reference component carrier of the set of component carriers.

7. The method of claim 1, wherein the transmission configuration indicator pool for the transmission configuration indicator state type is common for the set of component carriers.

8. The method of claim 1, wherein each transmission configuration indicator state type of the set of transmission configuration indicator state types shares the transmission configuration indicator pool and corresponds to different subsets of transmission configuration indicator indices per transmission configuration indicator state type.

9. The method of claim 1, wherein each transmission configuration indicator state type of the set of transmission configuration indicator state types corresponds to a separate transmission configuration indicator pool.

10. The method of claim 1, wherein the set of transmission configuration indicator state types comprises one or more of a joint downlink and uplink transmission configuration indicator, a downlink common beam transmission configuration indicator, an uplink common beam transmission configuration indicator, a downlink channel transmission configuration indicator, or an uplink channel transmission configuration indicator.

11. The method of claim 1, further comprising:
receiving an indication of a transmission configuration indicator state identifier associated with the transmission configuration indicator pool common to the set of transmission configuration indicator state types.

12. The method of claim 11, further comprising:
activating the directional beam based at least in part on the received indication of the transmission configuration indicator state identifier associated with the transmission configuration indicator pool common to the set of transmission configuration indicator state types, wherein the wireless communication via the directional beam is based at least in part on the activated directional beam.

13. The method of claim 11, further comprising:
updating the directional beam based at least in part on the received indication of the transmission configuration indicator state identifier associated with the transmission configuration indicator pool common to the set of transmission configuration indicator state types, wherein the wireless communication via the directional beam is based at least in part on the updated directional beam.

14. The method of claim 11, further comprising:
verifying a beam identifier and a set of tracking reference signal identifiers based at least in part on the received indication of the transmission configuration indicator state identifier associated with the transmission configuration indicator pool common to the set of transmission configuration indicator state types.

15. The method of claim 11, further comprising:
receiving the indication in a radio resource control message, a downlink control information message, or a medium access control-control element message.

16. The method of claim 1, further comprising:
determining that the set of component carriers corresponds to a configured component carrier list based at least in part on the received message comprising a radio resource control message, a downlink control information message, or a medium access control-control element message.

17. The method of claim 16, wherein the transmission configuration indicator state identifies the configured component carrier list.

18. A method of wireless communication at a network device, comprising:
transmitting a message comprising a transmission configuration indicator configuration, the transmission configuration indicator configuration comprising a transmission configuration indicator pool for a transmission configuration indicator state type of a set of transmission configuration indicator state types and a set of component carriers; and
performing the wireless communication via a directional beam based at least in part on the transmission configuration indicator pool for the transmission configuration indicator state type and the set of component carriers.

19. The method of claim 18, wherein the transmission configuration indicator pool for the transmission configuration indicator state type is common for the set of component carriers.

20. The method of claim 18, wherein each transmission configuration indicator state type of the set of transmission configuration indicator state types shares the transmission configuration indicator pool and corresponds to different subsets of transmission configuration indicator indices per transmission configuration indicator state type.

21. The method of claim 18, wherein each transmission configuration indicator state type of the set of transmission configuration indicator state types corresponds to a separate transmission configuration indicator pool.

22. The method of claim 18, wherein the set of transmission configuration indicator state types comprises one or more of a joint downlink and uplink transmission configuration indicator, a downlink common beam transmission configuration indicator, an uplink common beam transmission configuration indicator, a downlink channel transmission configuration indicator, or an uplink channel transmission configuration indicator.

23. The method of claim 18, further comprising:
transmitting an indication of a transmission configuration indicator state identifier associated with the transmission configuration indicator pool common to the set of transmission configuration indicator state types, wherein the indication is transmitted in a radio resource control message, a downlink control information message, or a medium access control-control element message.

24. The method of claim 18, wherein the set of component carriers corresponds to a configured component carrier list, wherein the transmission configuration indicator state identifies the configured component carrier list.

25. An apparatus for wireless communication, comprising:
a processor;
memory coupled with the processor; and
instructions stored in the memory and executable by the processor to cause the apparatus to:
receive a message comprising a transmission configuration indicator configuration;
determine, based at least in part on the transmission configuration indicator configuration, a transmission configuration indicator pool for a transmission configuration indicator state type of a set of transmission configuration indicator state types and a set of component carriers; and
perform the wireless communication via a directional beam based at least in part on the transmission configuration indicator pool for the transmission configuration indicator state type and the set of component carriers.

26. The apparatus of claim 25, wherein the instructions are further executable by the processor to cause the apparatus to:
receive an indication of a transmission configuration indicator state identifier associated with the transmission configuration indicator pool common to the set of transmission configuration indicator state types.

27. The apparatus of claim 26, wherein the instructions are further executable by the processor to cause the apparatus to:

determine a set of reference signal identifiers per component carrier of the set of component carriers based at least in part on the received indication of the transmission configuration indicator state identifier associated with the transmission configuration indicator pool common to the set of transmission configuration indicator state types.

28. An apparatus for wireless communication, comprising:
a processor;
memory coupled with the processor; and
instructions stored in the memory and executable by the processor to cause the apparatus to:
transmit a message comprising a transmission configuration indicator configuration, the transmission configuration indicator configuration comprising a transmission configuration indicator pool for a transmission configuration indicator state type of a set of transmission configuration indicator state types and a set of component carriers; and
perform the wireless communication via a directional beam based at least in part on the transmission configuration indicator pool for the transmission configuration indicator state type and the set of component carriers.

29. The apparatus of claim 28, wherein the transmission configuration indicator pool for the transmission configuration indicator state type is common for the set of component carriers.

30. The apparatus of claim 28, wherein the instructions are further executable by the processor to cause the apparatus to:
transmit an indication of a transmission configuration indicator state identifier associated with the transmission configuration indicator pool common to the set of transmission configuration indicator state types, wherein the indication is transmitted in a radio resource control message, a downlink control information message, or a medium access control-control element message.

* * * * *